United States Patent [19]

Mandish

[11] Patent Number: 4,468,885
[45] Date of Patent: Sep. 4, 1984

[54] HYDROPONIC SYSTEM WITH FLOATING PLANT TRAYS AND PRECAST CONCRETE SIDEWALLS

[76] Inventor: Theodore O. Mandish, 5055 State Rd. 46, Mims, Fla. 32754

[21] Appl. No.: 539,707

[22] Filed: Oct. 6, 1983

Related U.S. Application Data

[60] Continuation of Ser. No. 426,652, Sep. 29, 1982, abandoned, which is a division of Ser. No. 299,806, Oct. 26, 1982, Pat. No. 4,355,484.

[51] Int. Cl.³ .................... A01G 31/00; A01K 61/00
[52] U.S. Cl. .......................................... 47/59; 119/3; 119/4; 47/18
[58] Field of Search .................... 47/64-63, 47/59, 28 A, 18; 106/118; 52/731, 169.7; 119/3-5

[56] References Cited

U.S. PATENT DOCUMENTS

| | | | |
|---|---|---|---|
| 608,861 | 9/1898 | Horton | 52/731 |
| 972,220 | 10/1910 | O'Donoghue | 47/18 |
| 1,296,684 | 3/1919 | Mead | 47/18 |
| 1,360,669 | 11/1920 | Nielsen | 47/18 |
| 1,618,999 | 3/1927 | Roberts | 47/18 |
| 2,508,066 | 5/1950 | Holmstrom | 52/731 |
| 2,589,304 | 3/1952 | Spangler | 52/731 |
| 3,296,759 | 1/1967 | Pavlecua | 52/731 |
| 3,306,393 | 12/1981 | Shelton | 52/169.7 |
| 3,389,510 | 6/1968 | Stock | 47/28 A |
| 3,927,491 | 12/1975 | Farnsworth | 47/63 |
| 4,011,355 | 3/1977 | Mandish et al. | 106/118 |

FOREIGN PATENT DOCUMENTS

| | | | |
|---|---|---|---|
| 1174670 | 3/1959 | France | 119/4 |
| 2365953 | 4/1978 | France | 119/4 |
| 53-86393 | 7/1978 | Japan | 119/3 |
| 626457 | 12/1946 | United Kingdom | 47/18 |

*Primary Examiner*—E. H. Eickholt
*Attorney, Agent, or Firm*—William M. Hobby, III

[57] ABSTRACT

A floating hydroponic apparatus is provided along with a hydroponic system using the hydroponic apparatus. The floating hydroponic apparatus has a floating hydroponic tray having a floating base portion and a tray portion. The floating base portion is made of a lightweight cement and has floating perimeter walls along with a polymer screen attached between the floating base portion and the tray portion. The floating base portion and tray portion form a plurality of openings therethrough for the passage of liquid. An alkaline resistant coating is applied to at least a portion of the tray. The tray portion is filled with a soil mixture supported by the polymer screen so that plants can be grown in the soil in the trays while the trays are floating upon a liquid reservoir. The trays can be used in conjunction with a hydroponic system having pools with specially designed lightweight concrete walls forming a habitat for marine life.

8 Claims, 9 Drawing Figures

U.S. Patent  Sep. 4, 1984  Sheet 1 of 3  4,468,885
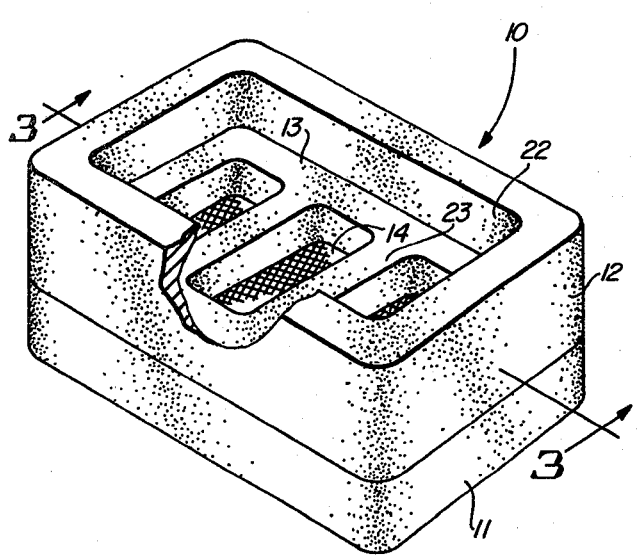
FIG-1
FIG-2
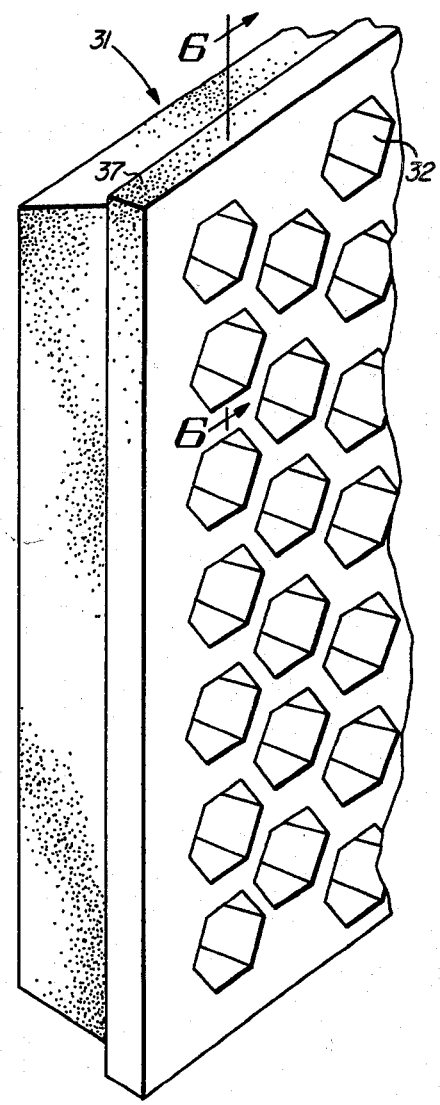
FIG-5
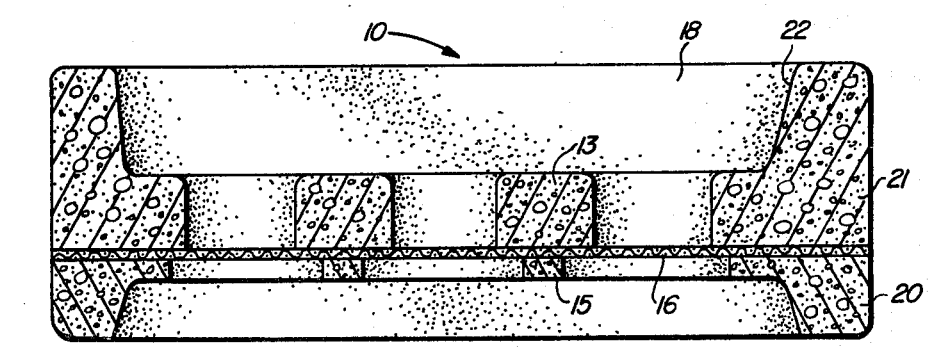
FIG-3

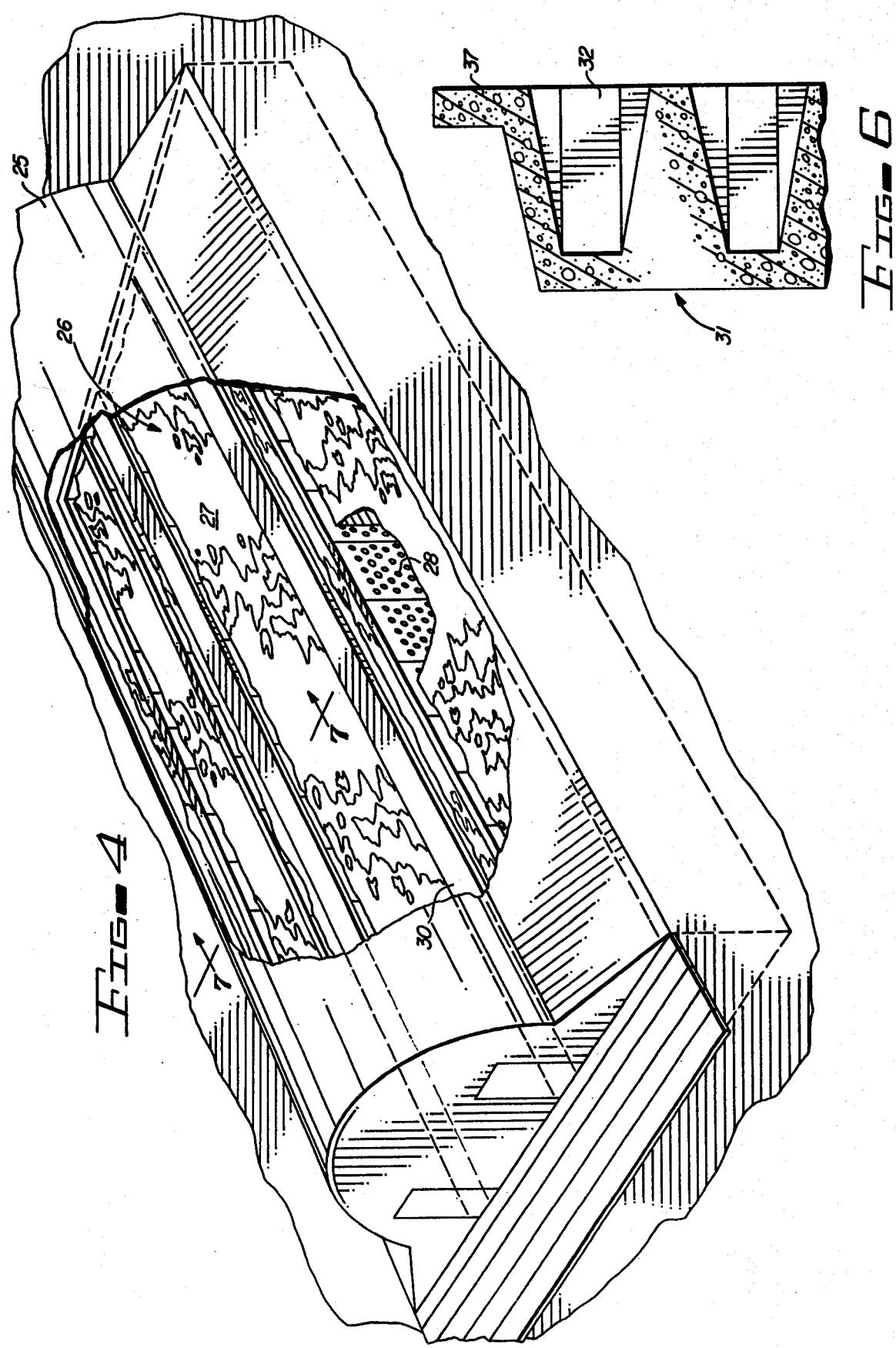

HYDROPONIC SYSTEM WITH FLOATING PLANT TRAYS AND PRECAST CONCRETE SIDEWALLS

This application is a continuation of U.S. patent application Ser. No.. 426,652, filed Sept. 29, 1982 now abandoned, which was a division of U.S. patent application Ser. No. 299,806, now U.S. Pat. No. 4,355,484 of Oct. 26, 1982 for Hydroponic Tray and Method of Manufacture.

BACKGROUND OF THE INVENTION

The present invention relates to hydroponic systems, and especially to a hydroponic system having a floating hydroponic tray for the growth of hydroponic plants and to a specially designed pool for the floating trays.

In the past, a wide variety of hydroponic devices have been provided for growing plants in a liquid nutrient. Typical hydroponic devices have supporting materials, such as rocks, to support the plant roots. Most prior art devices, however, are directed towards small containers for use in the home by individuals for growing their own plants. The present invention, on the other hand, is for commercial hydroponic farming which can be done on otherwise wasted swamp land or in specially constructed pools, in accordance with the present invention, and which pools can be utilized for harvesting shrimp or fish or other marine organisms in the pools below the floating hydroponic trays. Another advantage of the present invention is that floating trays are made of a lightweight concrete, which is fairly permanent and inexpensive to manufacture. However, since concrete is made with lime, the concrete will not totally prevent the seepage of water therethrough. A special treatment and coating is used on the concrete trays to prevent a shift in the pH in the hydroponic tray, which could damage plants which are frequently very sensitive to soil pH.

The present invention is a joint invention on U.S. Pat. No. 4,011,355 for a method emulsion coating for lightweight aggregate is for a method which uses hydrated alumina and dehydrated lime coating of beads, but this coating composition was well known long before this patent. In my prior U.S. Pat. No. 4,241,107 for a roof coating process, a method of applying lightweight cement to roofs is shown.

SUMMARY OF THE INVENTION

The present invention relates to a floating hydroponic tray apparatus and to a specially designed pool for floating the floating trays upon. The pool may be designed to provide a habitat for various types of marine life, such as shrimp or certain types of fish. The floating tray has a floating base portion and a tray portion. The base portion is made of lightweight cement and has a floating perimeter wall and hollow center portion. The upper tray portion also has coacting openings in the hollow portion of the floating tray and a polymer screen is mounted between the base portion and the tray portion. The concrete trays may be dipped in an acidic solution and leeched to neutralize the alkalinity. An alkaline resistant coating is then applied to at least a portion of the tray and the tray is filled with a soil mixture for supporting the growth of plants. Thus, floating the base portion with the tray attached thereto, will maintain the soil mixture moist from the water the tray is floating on. The lightweight concrete may be made from a mixture of cement, water, polystyrene beads, which beads are specially coated prior to the forming of the concrete trays. The soil moisture may include 50% or more of polystyrene beads, along with organic matter and an organic fertilizer, and may have been pre-treated with a fungicide and germicide. The alkaline resistant coating may be a polymer coating applied to the inner surface of the floating tray. The floating tray may be used in a specially designed pool and may have additional flotation added to the underside where heavier plants are to be grown.

The hydroponic system has a pool formed with walls, lightweight concrete and having a plurality of cavities formed in the walls for breeding marine life in the pool. A floating hydroponic tray may be floated on the pools. Pools may be formed of walls which can be pre-cast and interconnected and may have inner dividing walls for spacing the hydroponic trays which may include catwalks for access to the floating trays.

A method is also provided for making a hydroponic tray including the steps of mixing foam polymer beads, such as polystyrene beads, with a mixture including dehydrated lime and hydrated alumina in approximately equal amounts, then mixing said coated beads with cement. The beads and cement are then mixed with water and molded to form a hydroponic tray in accordance with the present invention. The molded tray is dipped in a weak acid solution, such as muratic acid, diluted with water (10–15% muratic acid in water), the tray is then leeched with water to remove excess acid and at least the inside portion of the tray is coated with a polymeric coating, which is alkaline resistant. The process may also include the filling of the trays with a mixture of polymer beads and an organic material, such as sawdust, and may also include organic fertilizer in the mixture as well as a germicide and fungicide, as desired.

BRIEF DESCRIPTION OF THE DRAWINGS

Other objects, features and advantages of the present invention will be apparent from the written description and the drawings, in which:

FIG. 1 is a top perspective view with a removed portion of a floating hydroponic tray in accordance with the present invention;

FIG. 2 is a bottom perspective view of the floating tray in accordance with FIG. 1;

FIG. 3 is a sectional view taken on the line 3—3 of FIG. 1;

FIG. 4 is a cutaway perspective view of a covered hydroponic greenhouse in accordance with the present invention;

FIG. 5 is a cutaway perspective view of a portion of a wall of the hydroponic pool in accordance with the present invention;

FIG. 6 is a sectional view taken on the line 6—6 of FIG. 5;

DESCRIPTION OF THE PREFERRED EMBODIMENTS

Figure 7:
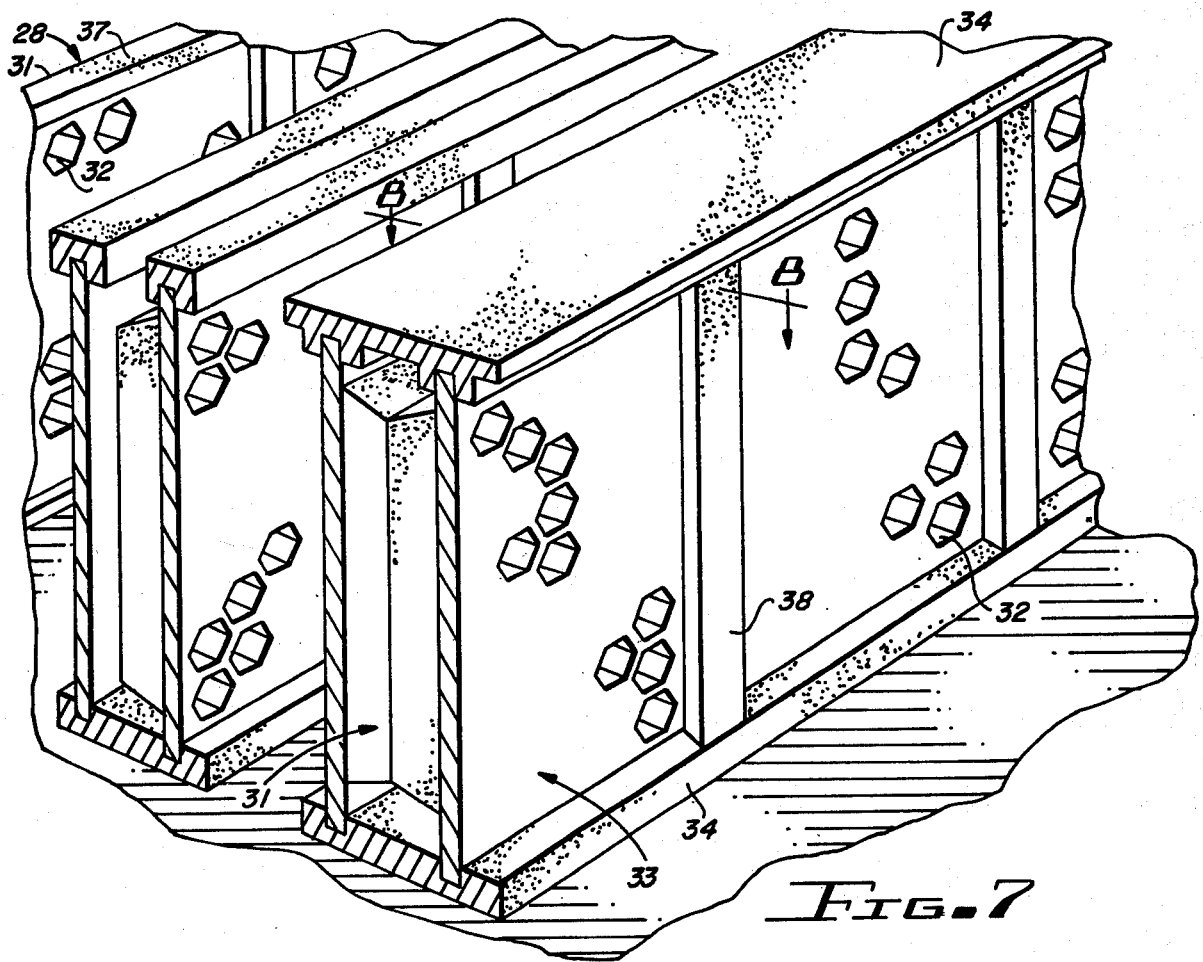
FIG. 7 is a partial perspective view taken on the line 7—7 of FIG. 4.

Referring to FIGS. 1 through 3, a floating hydroponic tray 10 has a floating base portion 11 formed of lightweight concrete made using cement and polystyrene beads. The ratio of the beads is such that the lightweight concrete will float in water and will support a lightweight cement tray portion 12. The tray portion is hollow with support members 13 having open spaces 14 therebetween. The floating base portion is also hollow with support members 15 therein and has a polymer screen 16 molded therein to fill the open spaces 17 in the base portion 11 and the open spaces 14 in the tray portion. The tray portion 12 is formed of a lightweight concrete made from a mixture of cement and polystyrene beads, which beads may be coated to prevent the beads from floating during the curing of the concrete, so that the beads remain more uniformly distributed throughout the concrete. The trays may also be reinforced with small fiberglass, stainless steel, or other fibers if desired. The floating tray 10 and tray portion 12 is filled with soil 18, as shown in FIG. 3, which is supported on the screen 16 which is maintained between the brace members 15 and the tray portions 13 and is formed into the perimeter walls 20 and 21 of the floating base portion 11 and of tray portion 12. It should be clear at this point that the floating hydroponic unit 10 can be formed in one piece or in two pieces in which the tray portion 12 is removable from the lower base portion.

In the embodiment shown, the floating tray is formed in one piece with the screen extending all the way to the edge of the walls. The soil 18 is specially formulated of fifty percent (50%) or more of polystyrene beads mixed with organic material, such as sawdust, or the like, and with an organic fertilizer having a slow release of the nutrients. The floating hydroponic apparatus 10, once charged, does not have to be fertilized or cared for until after harvesting, at which time the soil can be replaced. The soil can also be treated with a fungicide and germicide prior to charging the floating tray. The tray is dipped in an acid solution and leeched to neutralize the alkalinity. The tray interior walls 22 and the bottom surface 23 are then coated with an alkaline resistant coating, such as a polymeric coating, to prevent the seepage of the alkaline from the cement into the soil and damaging the plants. The interior of the floating base can also be treated as desired, but it is not necessary to treat the exterior walls of the floating tray.

It should be clear at this point that a floating hydroponic tray has been provided which will continuously provide water from the pool that the tray is floating on. The tray can float in pools, ponds, or shallow swamps, as desired, while providing the necessary liquid for the hydroponic growth of plants and will require little care once the trays are charged with the soil composition.

The use of concrete allows for a relatively permanent, long lasting tray that can be used for many growing seasons without replacement. Cement, when formed with the lightweight polystyrene beads, float in water to provide ample water to the roots of the plant. The acid treatment and coating prevent the soil from becoming alkaline and stunning the growth or damaging the plants. The polystyrene beads may be coated with a mixture including dehydrated lime and hydrated alumina with sufficient water having a wetting agent therein to form a suitable consistancy which is then coated onto the polystyrene beads and mixed with the dry cement, which can then have water added to the cement mixture which can be formed and cured. The coating mixture may include equal parts of dehydrated lime and hydrated alumina. The coating prevents the beads from floating, as well as assisting the beads in remaining dispersed in the concrete after the concrete is mixed with water and molded to the shape of trays, rather than tending to float to the top.

Turning to FIGS. 4 through 9, a pool system is shown built into a greenhouse in FIG. 4 for floating the hydroponic trays of FIGS. 1 through 3 in a commercial operation; such as where a swamp or other wet lands are not available. A greenhouse top 25 may be made of a transparent polymer and may be an inflatable top if desired, even though in most southern climates, the greenhouse cover 25 is not necessary for the use of the floating hydroponic unit. Inside the cover 25 are pools 26 filled with water 27, but which pools are formed with walls 28 and interior dividing walls 30. The pools are formed by removing the earth and assembling prefabricated walls 31 which are made out of lightweight concrete, such as the floating trays in FIGS. 1 through 3, having cement mixed with polystyrene beads which beads are coated prior to forming of the concrete. The lightweight concrete walls 31 may also be reinforced if desired, either by reinforcing rods or screen, or by adding stainless steel or synthetic fibers into the concrete mixture, which provides a substantial strengthening of the lightweight concrete. The walls are formed in thick sections having a plurality of cavities 32 formed therein to form habitats for marine life, such as shrimp, in the pools which are growing hydroponic plants on top of the pool. Certain types of marine life do not breed rapidly unless provided with cavities, or other areas in which to breed and shrimp are territorial and need a territory to discourage cannibalistic instincts. FIG. 6 shows the inside of the cavity 32 and of the wall 31 formed of lightweight concrete. In FIG. 7, the wall 28 having the wall section 31 with the cavity 32 form the bodies of the pool, while interior walls 33 are formed with a pair of wall sections 31 mounted back to back forming rows within the pool 26 to maintain the floating hydroponic trays 10 in lines under water for easy access to the hydroponic trays. A catwalk structural member 34 can also be made of reinforced concrete having grooves 35 and 36 formed therein for engaging the flange portions 37 of the walls 31. In addition, the walls are held along their vertical edges with a connecting member 38 having elongated grooves 40 on either side thereof. Connecting member 38 can be formed of reinforced concrete to engage the flanges 37 along the sides of the wall sections. Thus, the member 38 holds each wall together while the catwalk portions 34 are placed on the top and bottom of the interior wall sections and the corner wall sections are held with members similar to connecting member 38 to form a 90 corner. The walls can be further strengthened by the addition of a polymer adhesive in the grooves and tend to support each other by the connections between the wall sections.

Figure 8:
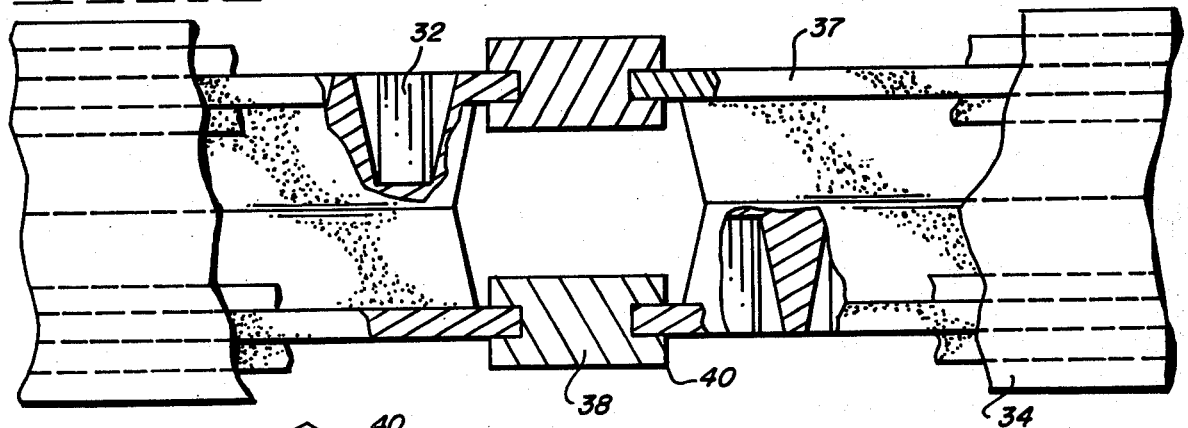
FIG. 8 is a cutaway sectional view taken on the line 8—8 of FIG. 7.
Figure 9:
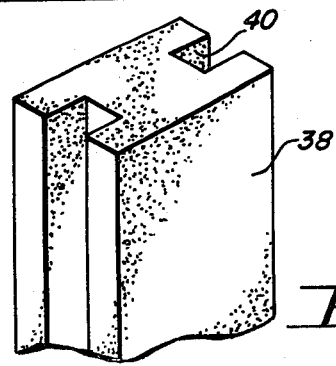
FIG. 9 is a partial perspective view of the connecting members for the walls.

In FIG. 8, a cutaway view shows the wall flanges 37 connected to the grooves 40 of the connecting members 38 for the front and back flanges and an interior wall having a catwalk 34 mounted on top thereof for supporting the top and bottom flange portions 37 to thereby mount the plurality of cavities 32 in the walls facing either side of the jointly mounted walls. The entire wall section cavities can be coated with a polymer coating if desired.

It should be clear that a hydroponic system has been provided for growing hydroponic plants, while at the same time harvesting certain marine products. However, the invention is not to construed as limited to the particular forms disclosed herein, which are to be regarded as illustrative rather than restrictive.

I claim:

1. A hydroponic system comprising in combination:
   a liquid reservoir having lightweight concrete wall sections connected together to form said reservoir;
   marine organism habitat means formed in each said concrete wall section and including a plurality of open cavities formed in each wall section; and
   floating plant trays floating in said liquid reservoirs, said floating trays having a soil mixture therein for the growth of plants.

2. A hydroponic system in accordance with claim 1, in which each prefabricated wall section has a flanged portion therearound adapted to fit into a connecting member having a pair of grooves for connecting one side of each of two walls sections for locking said wall sections together to form said pools.

3. A hydroponic system in accordance with claim 2, in which said reservoir has interior wall sections formed of back-to-back wall sections connected with reinforced concrete catwalks having double grooves for fitting onto the flanges of one edge of the back-to-back wall sections.

4. A hydroponic system in accordance with claim 3, in which said liquid reservoir wall sections are prefabricated of lightweight concrete formed with cement and polystyrene beads and includes reinforcing steel fibers therein.

5. A hydroponic system in accordance with claim 1, including a transparent polymer inflatable top covering said floating trays.

6. A system in accordance with claim 1, inwhich said liquid reservoir has a transparent plastic cover mounted thereover for protecting said reservoir and floating trays.

7. A hydroponic system having a prefabricated panel for forming a liquid reservoir comprising in combination:
   a plurality of wall panels each wall panel having a plurality of flanged edges formed thereon;
   a marine organism habitat means formed in each wall panel and including a plurality of open cavities formed therein;
   a plurality of first panel connecting members, each having a pair of grooves for connecting two prefabricated wall panels with the wall panel flanged edges connected to the grooves of the connecting members
   at least one second connecting member for connecting the flanges on at least two prefabricated wall sections along an edge substantially perpendicular to said first connecting members, whereby said prefabricated wall sections are locked together to provide a habitat for marine life; and
   said second connecting member having a pair of elongated grooves formed therein for connecting pairs of prefabricated wall sections back-to-back and having a walking surface along the top thereof forming a walkway therealong.

8. A prefabricated wall section in accordance with claim 7, in which said prefabricated walls sections are connected to form a liquid reservoir, said liquid reservoir having a plurality of floating plant trays floating therein and said floating trays having a soil mixture therein for the growth of plants.

* * * * *